US008447705B2

(12) United States Patent
Fujimaki et al.

(10) Patent No.: US 8,447,705 B2
(45) Date of Patent: May 21, 2013

(54) PATTERN GENERATION METHOD, PATTERN GENERATION APPARATUS, AND PROGRAM

(75) Inventors: Ryohei Fujimaki, Tokyo (JP); Syunsuke Hirose, Tokyo (JP); Takayuki Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 814 days.

(21) Appl. No.: 12/528,283

(22) PCT Filed: Feb. 21, 2008

(86) PCT No.: PCT/JP2008/052940
§ 371 (c)(1),
(2), (4) Date: Aug. 21, 2009

(87) PCT Pub. No.: WO2008/102840
PCT Pub. Date: Aug. 28, 2008

(65) Prior Publication Data
US 2010/0121793 A1 May 13, 2010

(30) Foreign Application Priority Data
Feb. 21, 2007 (JP) ................................. 2007-041125

(51) Int. Cl.
G06F 15/18 (2006.01)
G06F 17/20 (2006.01)

(52) U.S. Cl.
USPC .............................. 706/12; 703/11; 702/176

(58) Field of Classification Search
None
See application file for complete search history.

(56) References Cited

U.S. PATENT DOCUMENTS

| 6,873,983 B2 | 3/2005 | Ugai et al. |
| 2004/0024773 A1* | 2/2004 | Stoffel et al. ................. 707/102 |
| 2006/0224356 A1* | 10/2006 | Castelli et al. ................ 702/176 |
| 2007/0294247 A1* | 12/2007 | Papadimitriou et al. .......... 707/6 |

FOREIGN PATENT DOCUMENTS

| JP | 2002351897 A | 12/2002 |
| JP | 2004-185490 A | 7/2004 |

OTHER PUBLICATIONS

International Search Report for PCT/JP2008/052940 mailed Mar. 18, 2008.
G. Das et al., "Rule Discovery From Time Series", In Proceedings of the 4th ACM SIGKDD International Conference on Knowledge Discovery and Data Mining, pp. 16-22, 1998.
Japanese Office Action for JP2009-500230 mailed Jun. 5, 2012.

* cited by examiner

*Primary Examiner* — Kakali Chaki
*Assistant Examiner* — Kalpana Bharadwaj

(57) ABSTRACT

Disclosed is an apparatus that generates automatically a characteristic pattern in time series data by clustering a plurality of time series subsequences generated from the time series data. The apparatus includes a time series subsequence generation unit that generates a plurality of time series subsequences from the time series data, a phase alignment unit that aligns a phase of the generated time series subsequence, a clustering unit that performs clustering of a plurality of the time series subsequences, each having a phase aligned, a storage apparatus that stores the pattern obtained by the clustering, and an output apparatus that outputs the stored pattern.

6 Claims, 2 Drawing Sheets

PATTERN GENERATION METHOD, PATTERN GENERATION APPARATUS, AND PROGRAM

This application is the National Phase of PCT/JP2008/052940, filed Feb. 21, 2008, which is based upon and claims priority to Japanese Patent Application No. 2007-041125, filed Feb. 21, 2007, the entirety of which is incorporated herein by reference.

TECHNICAL FIELD

The present invention relates to a pattern generation method and a pattern generation apparatus. More specifically, the invention relates to a pattern generation method, a pattern generation apparatus, and a program medium for time series data, suitable for being applied to data mining or the like.

BACKGROUND ART

Various methods of analyzing time series data in terms of a frequency domain or a time domain have been proposed so far. Recently, a technique for extracting a characteristic pattern from time series data that varies with the characteristic pattern is needed in terms of data mining.

Typically, when a pattern is generated from time series data, a plurality of time series subsequences, each subsequence having a length w (w<<W), are generated from a time series of an original length W. Then, a plurality of time series subsequences undergo a process such as clustering. Some methods and apparatuses of pattern generation from a time series that follow such a procedure are proposed (as shown in Non-patent Document 1, for example)

Non-patent Document 1: G. Das, K. I. Lin, H. Mannila, G. Renganathan, and P. Smyth. Rule discovery from time series. In Proceedings of the 4th ACM SIGKDD International Conference on Knowledge Discovery and Data Mining, pages 16-22, 1998.

Non-patent Document 2: E. Keogh, J. Lin, and W. Truppel. Clustering of Time Series Subsequences is Meaningless: Implications for Previous and Future Research. In proceedings of the 3rd IEEE International Conference on Data Mining, 2003.

Non-patent Document 3: T. Ide. Why does Subsequence Time-series Clustering Produce Sine Waves? In Proceedings of the 10th European Conference on Principles and Practice of Knowledge Discovery in Databases (PKDD 06), 2006.

SUMMARY

Disclosures of Non-patent Documents 1 to 3 listed above are incorporated herein by reference. Analysis of related arts by the present invention will be given below.

As pointed out in Non-patent Document 2, when a plurality of time series subsequences are generated from time series data that varies with a characteristic pattern and a pattern is generated by clustering a plurality of the time series subsequences, the pattern generated without depending on the original time series assumes a shape similar to a sine wave (which is referred to as a sinusoid effect (Sinusoid Effect)).

The reason for this phenomenon is that, since this phenomenon is essentially a problem that has not been solved yet, the pattern cannot be essentially prevented from becoming the sine wave.

Non-patent Document 3 shows that when k-means clustering imposes an orthogonal constraint between cluster centers, the resulting cluster centers match left-singular vectors of a data Hankel matrix. This theoretically shows generation of the sine wave. However, a method of avoiding the generation of the sine wave is not referred to.

An object of the present invention is to provide an apparatus and a method in which, when automatically generating a characteristic pattern in time series data by clustering a plurality of time series subsequences, the characteristic pattern may be generated without causing the pattern to assume a shape similar to a sine wave.

In order to solve one or more of the problems described above, the invention disclosed in this application is generally configured as follows.

According to the present invention, there is provided an apparatus that automatically generates a characteristic pattern from time series data by clustering a plurality of time series subsequences of the time series data. The apparatus includes:

a phase alignment unit that aligns a phase of the time series subsequence; and a clustering unit that performs clustering of a plurality of the time series subsequences, each subsequence having a phase aligned.

The pattern generation apparatus according to the present invention may further include:

a time series subsequence generation unit that generates a plurality of the time series subsequences from time series data inputted from an input apparatus;

a storage apparatus that stores the pattern obtained by the clustering; and an output apparatus that outputs the pattern stored in the storage apparatus.

According to the present invention, there is provided a pattern generation method that, in automatically generating a characteristic pattern from time series data by clustering a plurality of time series subsequences of the time series data, comprises the steps of:

aligning a phase of the time series subsequence; and clustering a plurality of the time series subsequences, each subsequence having a phase aligned.

According to the present invention, there is provided a computer-readable recording medium storing a program that causes a computer which automatically generates a characteristic pattern from time series data by clustering a plurality of time series subsequences of the time series data to execute the processing comprising:

aligning a phase of the time series subsequence; and clustering a plurality of the time series subsequences, each subsequence having a phase aligned.

In the present invention, when the phase of the time series subsequence is aligned, the time series subsequence may be transformed into a representation where the time series subsequence is represented by expansion of base functions;

the base functions may be shifted, based on a certain criteria, in accordance with one of the base functions that contributes most in the representation of the time series subsequence, obtained as a result of the transformation; and inverse transformation of the transformation may be applied to the representation of the time series subsequence where the base functions have been shifted, to derive the phase-aligned time series subsequence.

The present invention makes it possible to automatically extract a characteristic pattern from time series data that varies with the characteristic pattern. The reason for allowing extraction of the characteristic pattern is as follows. A phenomenon (sinusoid effect) in which a pattern assumes a shape similar to a sine wave when a plurality of time series subsequences are clustered is caused by a change in spectrum due to superposition of a plurality of time series subsequences having different phases. For this reason, by aligning a phase of the time series subsequence and clustering a plurality of the time series subsequences, each of which has a phase aligned, according to the present invention, the pattern does not assume the shape similar to the sine wave (which means that the sinusoid effect is avoided), thereby making it possible to generate the characteristic pattern.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
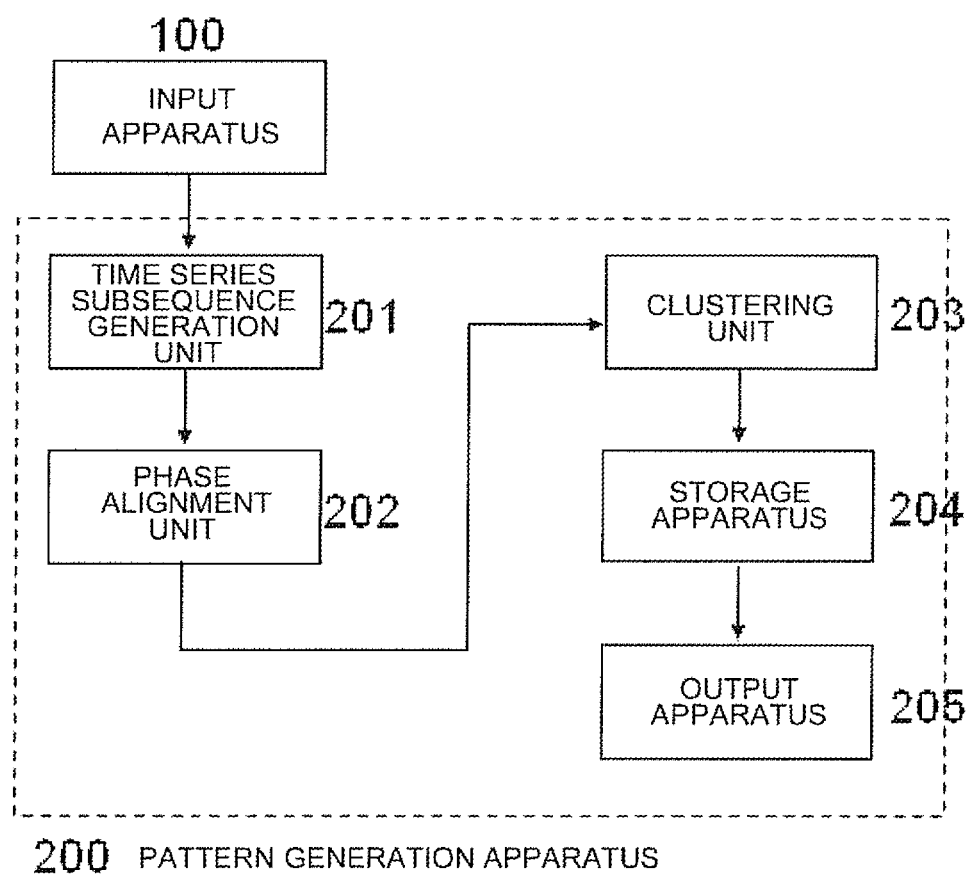
FIG. 1 is a diagram showing a configuration of an exemplary embodiment of the present invention.

Next, exemplary embodiments of the present invention will be described in detail with reference to drawings. FIG. 1 is a diagram showing a configuration of a pattern generation apparatus 200 in an exemplary embodiment of the present invention. The pattern generation apparatus 200 includes a time series subsequence generation unit 201, a phase alignment unit 202, a clustering unit 203, a storage apparatus 204, and an output apparatus 205.

The time series subsequence generation unit 201 generates a plurality of time series subsequences, each having an appropriate length from input time series data.

The phase alignment unit 202 performs alignment of a phase of the time series subsequence generated by the time series subsequence generation unit 201.

The clustering unit 203 performs clustering of a plurality of the time series subsequences, each of which has a phase aligned by the phase alignment unit 202.

The storage apparatus 204 stores a pattern generated by the clustering unit 203.

The output apparatus 205 outputs the pattern stored in the storage apparatus 204. The processes and functions of the respective unit (a time series subsequence generation unit 201, a phase alignment unit 202, a clustering unit 203, and so forth) in the pattern generation apparatus 200 in FIG. 1 may be of course implemented by a program that is executed on a computer which constitutes the pattern generation apparatus 200.

Figure 2:
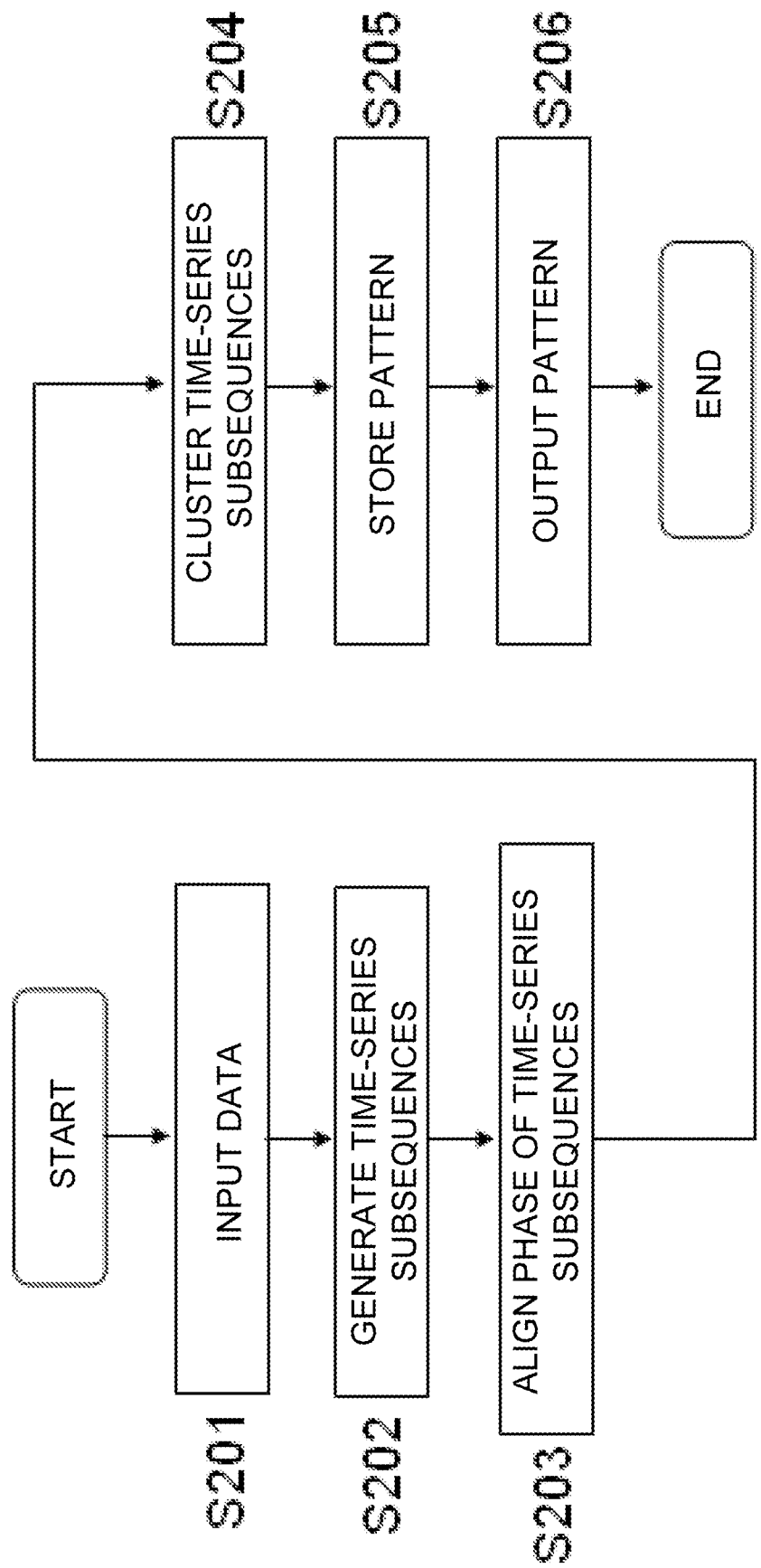
FIG. 2 is a flowchart for explaining an operation procedure of the exemplary embodiment of the present invention.

FIG. 2 is a flowchart for explaining an operation procedure of the pattern generation apparatus 200 in FIG. 1.

The pattern generation apparatus 200 in FIG. 1 operates as follows.

First, the pattern generation apparatus 200 reads time series data from an input apparatus 100 (in step S201).

Next, a plurality of time series subsequences are generated from the input time series data by the time series subsequence generation unit 201 (in step S202).

A plurality of time series subsequences may be generated by using a sliding window method (method using a sliding window of a fixed size) in which a window of a fixed length w is slid by a sliding length s, thereby generating the plurality of time series subsequences. Alternatively, a method in which a plurality of time series subsequences each having a length w are sampled from the input time series at random.

Next, the phase of the generated time series subsequence is aligned by the phase alignment unit 202 (in step S203).

Some methods of aligning the phase of the time series subsequence may be conceived. A specific example will be described below.

Assuming that the time series subsequence of the length w is y(t), a Fourier coefficient, when the time series subsequence y(t) is Fourier transformed, is expressed by Expression (1):

$$f_y(\lambda) = \sum_{t=-T}^{T} y(t)e^{-i\lambda t} \ (\lambda = \lambda_{-T}, \ldots, \lambda_T)$$

in which T and λ are respectively given by Expressions (2) and (3):

$$T = \begin{cases} w/2, & \text{if } w \text{ is even} \\ (w-1)/2, & \text{if } w \text{ is odd} \end{cases} \quad (2)$$

$$\lambda_j = 2\pi j/w \ (j = -T, \ldots, T) \quad (3)$$

In this case, a frequency of which $|f_y(\lambda)|$ is maximum (frequency component having a maximum spectrum power) is given by Expression (4).

$$\lambda_y^* = \max_\lambda |f_y(\lambda)| \quad (4)$$

The Fourier coefficient (Fourier component) of the frequency expressed by Expression (4) is given by Expression (5):

$$f_y(\lambda_y^*) = |f_y(\lambda_y^*)|e^{-\lambda_y^* I_y^*} \quad (5)$$

Here, $I_{y^*}$ in general is not an integer. Thus, an integer which is closest to $I_{y^*}$ is set to $I_y$.

Next, phase alignment is performed by performing inverse Fourier transform after the phase is shifted just by $I_y$.

Assuming that a time series subsequence obtained by aligning the phase of the time series subsequence y(t) is set to z(t), z(t) is expressed by Expression (6):

$$z(t) = \sum_{j=-T}^{T} f_y(\lambda_j)e^{i\lambda j(t-I_y)} \quad (6)$$

When the Fourier transform is a DFT (discrete Fourier transform), the right side of the above Expression (6) can be expressed by $y(t+I_y)$. That is, the time series subsequence z(t) in Expression (6) is obtained by circular-shifting the original time series subsequence y(t) by $I_y$ clockwise. In the present invention, the transform on the time series subsequence is not limited to the Fourier transform in which the time series subsequence is expanded as a superposition of orthonormal base functions (trigonometric functions). An arbitrary orthogonal transform such as a wavelet transform, an arbitrary linear transform, or the like may be of course applied.

Next, an arbitrary clustering algorithm is applied to a plurality of the phase-aligned time series subsequences. As the clustering algorithm, there is k-means clustering or hierarchical clustering, for example. Though no limitation is imposed, the pattern is expressed as a superposition of a plurality of time series subsequences included in a same cluster, in the case of the k-means clustering or the hierarchical clustering (in step S204), for example.

Next, the generated pattern is stored in the storage apparatus 204 (in step S205).

Next, the output apparatus 205 outputs the pattern stored in the storage apparatus 204 (in step S206).

The input time series data in the exemplary embodiment of the present invention does not have dependence on an application field in the purpose of generating the characteristic pattern. A description will be given below about some of exemplary embodiments of the present invention.

First, a first exemplary embodiment of the present invention will be described. In this exemplary embodiment, time series data on a stock price or economy is received through an input apparatus 100. By supplying this data to a pattern generation apparatus 200, a variation pattern of the data on the stock price or the like can be automatically generated. Understanding of variations of the stock price can be thereby assisted.

A second exemplary embodiment of the present invention will be described. In this exemplary embodiment, each time series data on a plurality of attributes such as the number of engine rotations of a vehicle and an electric current value is received through an input apparatus 100. This data is each supplied to a pattern generation apparatus 200. A characteristic pattern of each time series data is thereby generated.

A rule on collocation of a pattern extending over a plurality of attributes or a temporal relationship between patterns may be set up by a man or a data mining technique. A plurality of attribute data on a vehicle can be monitored, and a fault on the vehicle can be diagnosed by this rule, for example.

The above description about the present invention was given in connection with the exemplary embodiments described above. The present invention is not limited to the configuration of each of the exemplary embodiments described above, and of course includes various variations and modifications that could be made by those skilled in the art within the scope of the present invention.

What is claimed is:

1. A pattern generation apparatus that automatically generates a pattern from time series data by clustering a plurality of time series subsequences of the times series data, the apparatus comprising:
   a phase alignment unit that aligns a phase of the time series subsequence; and
   a clustering unit that performs clustering of a plurality of the time series subsequences, each having a phase aligned,
   wherein the phase alignment unit transforms the time series subsequence into a representation in which the time series subsequence is represented by expansion of base functions;
   shifts the base functions, based on a certain criteria, in accordance with one of the base functions that contributes most in the representation of the time series subsequence obtained as a result of the transformation; and
   applies inverse transformation of the transformation to the representation of the time series subsequence in which the base functions have been shifted to derive the time series subsequence having a phase aligned.

2. The pattern generation apparatus according to claim 1, wherein the transformation includes a Fourier transform, where the base functions comprise trigonometric functions, and wherein the phase alignment unit shifts a phase of each component of the time series subsequence, using a value corresponding to the phase of the component having an amplitude, an absolute value of which is maximum in the representation of the time series subsequence in a frequency domain obtained as a result of the Fourier transform, and
applies an inverse Fourier transform to the representation of the time series subsequence in the frequency domain where the phase of each component has been shifted to obtain the time series subsequence having a phase aligned.

3. A pattern generation method of automatically generating a pattern from time series data by clustering a plurality of time series subsequences of the time series data, the method comprising:
   aligning a phase of the time series subsequence; and
   clustering a plurality of the time series subsequences, each having a phase aligned,
   wherein the method, in aligning the phase of the time series subsequence, comprises:
   transforming the time series subsequence into a representation in which the time series subsequence is represented by expansion of base functions;
   shifting the base functions, based on a certain criteria, in accordance with one of the base functions that contributes most in the representation of the time series subsequence obtained as a result of the transformation; and
   applying inverse transformation of the transformation to the representation of the time series subsequence where the base functions have been shifted to derive the time series subsequence having a phase aligned.

4. The pattern generation method according to claim 3, wherein the transformation includes a Fourier transform where the base functions comprise trigonometric functions, and wherein the method, in aligning the phase of the time series subsequence, comprises:
   shifting a phase of each component of the time series subsequence, using a value corresponding to the phase of a component having an amplitude, an absolute value of which is maximum in an representation of the time series subsequence in a frequency domain obtained as a result of the Fourier transform; and
   applying an inverse Fourier transform to the representation of the time series subsequence in the frequency domain where the phase of each component of the subsequence has been shifted to obtain the time series subsequence having a phase aligned.

5. A non-transitory computer-readable recording medium storing a program that causes a computer which automatically generates a pattern from time series data by clustering a plurality of time series subsequences of the time series data to execute the processing comprising:
   aligning a phase of the time series subsequence; and
   clustering a plurality of the time series subsequences, each having a phase aligned,
   wherein the processing of aligning the phase of the time series subsequence comprises:
   transforming the time series subsequence into a representation in which the time series subsequence is represented by expansion of base functions;
   shifting the base functions, based on a certain criteria, in accordance with one of the base functions that contributes most in the representation of the time series subsequence obtained as a result of the transformation; and
   applying inverse transformation of the transformation to the representation of the time series subsequence where the base functions have been shifted to derive the time series subsequence having a phase aligned.

6. The non-transitory computer-readable recording medium according to claim 5, wherein the transformation includes a Fourier transform where the base function comprise trigonometric functions; and wherein the processing of aligning the phase of the time series subsequence comprises:

shifting a phase of each component of the time series subsequence using a value corresponding to the phase of the component having an amplitude, an absolute value of which is maximum in an representation of the time series subsequence in a frequency domain obtained as a result of the Fourier transform; and applying an inverse Fourier transform to the representation of the time series subsequence in the frequency domain where the phase of each component has been shifted, to obtain the time series subsequence having a phase aligned.

* * * * *